(12) United States Patent
Bataev et al.

(10) Patent No.: US 12,444,409 B2
(45) Date of Patent: Oct. 14, 2025

(54) HYBRID LANGUAGE MODELS FOR CONVERSATIONAL AI SYSTEMS AND APPLICATIONS

(71) Applicant: NVIDIA Corporation, Santa Clara, CA (US)

(72) Inventors: Vladimir Bataev, Yerevan (AM); Roman Korostik, Yerevan (AM); Evgenii Shabalin, Moscow (RU); Vitaly Sergeyevich Lavrukhin, Campbell, CA (US); Boris Ginsburg, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 211 days.

(21) Appl. No.: 18/468,086

(22) Filed: Sep. 15, 2023

(65) Prior Publication Data

US 2024/0135920 A1 Apr. 25, 2024
US 2024/0233714 A9 Jul. 11, 2024

Related U.S. Application Data

(60) Provisional application No. 63/417,627, filed on Oct. 19, 2022.

(51) Int. Cl.
*G10L 15/00* (2013.01)
*G10L 15/065* (2013.01)
*G10L 15/16* (2006.01)

(52) U.S. Cl.
CPC ............ *G10L 15/16* (2013.01); *G10L 15/065* (2013.01)

(58) Field of Classification Search
None
See application file for complete search history.

(56) References Cited

U.S. PATENT DOCUMENTS 11,138,471 B2 * 10/2021 Park .................. G06N 3/045
11,605,384 B1    3/2023 Dalton et al.
(Continued)

OTHER PUBLICATIONS

Karras, et al., "Analyzing and Improving the Image Quality of StyleGAN", https://arxiv.org/abs/1912.04958, Mar. 23, 2020, 21 pgs.
(Continued)

*Primary Examiner* — Satwant K Singh
(74) *Attorney, Agent, or Firm* — Taylor Duma L.L.P.

(57) ABSTRACT

In various examples, first textual data may be applied to a first MLM to generate an intermediate speech representation (e.g., a frequency-domain representation), the intermediate audio representation and a second MLM may be used to generate output data indicating second textual data, and parameters of the second MLM may be updated using the output data and ground truth data associated with the first textual data. The first MLM may include a trained Text-To-Speech (TTS) model and the second MLM may include an Automatic Speech Recognition (ASR) model. A generator from a generative adversarial networks may be used to enhance an initial intermediate audio representation generated using the first MLM and the enhanced intermediate audio representation may be provided to the second MLM. The generator may include generator blocks that receive the initial intermediate audio representation to sequentially generate the enhanced intermediate audio representation.

20 Claims, 10 Drawing Sheets

(56) References Cited

U.S. PATENT DOCUMENTS

| | | | |
|---|---|---|---|
| 2013/0225240 | A1 | 8/2013 | Largey et al. |
| 2020/0364303 | A1 | 11/2020 | Liu et al. |
| 2021/0074316 | A1* | 3/2021 | Souden .................. G10L 15/25 |
| 2021/0150187 | A1 | 5/2021 | Karras et al. |
| 2022/0012537 | A1* | 1/2022 | Park ......................... G06N 7/01 |
| 2022/0028390 | A1* | 1/2022 | Poznanski ............... G10L 15/19 |
| 2022/0201121 | A1* | 6/2022 | Kane ....................... G10L 25/30 |
| 2023/0326445 | A1* | 10/2023 | Adam .................. G10L 13/033 |
| | | | 704/260 |

OTHER PUBLICATIONS

Ioffe, S., and Szegedy, C., "Batch Normalization: Accelerating Deep Network Training by Reducing Internal Covariate Shift", arXiv:1502.03167v3 [cs.LG], pp. 1-12 (Mar. 2, 2015), Available at: https://arxiv.org/abs/1502.03167.

Kingma, D. P., and Ba, J. L., "Adam: A Method for Stochastic Optimization", published as a conference paper at CLR 2015, arXiv:1412.6980v9 [cs.LG], pp. 1-15 (Jan. 30, 2017).

Gulati, et al.; "Conformer: Convolution-augmented Transformer for Speech Recognition," https://arxiv.org/abs/2005.08100; May 16, 2020, 5 pgs.

Vaswani, et al.; "Attention is All You Need," https://arxiv.org/abs/1706.03762; Aug. 2, 2023, 15 pgs.

Li, et al.; "Recent Advances in End-to-End Automatic Speech Recognition," https://arxiv.org/abs/2111.01690, Feb. 2, 2022, 27 pgs.

Li, et al.; "Training neural speech recognition systems with synthetic speech augmentation," https://arxiv.org/abs/1811.00707, Nov. 2, 2018, 5 pgs.

Laptev, et al.; "You do not need more data: Improving end-to-end speech recognition by text-to-speech data augmentation," https://arxiv.org/abs/2005.07157, Jul. 30, 2020, 6 pgs.

Li, et al.; "Developing RNN-T Models Surpassing High-Performance Hybrid Models with Customization Capability," https://arxiv.org/abs/2007.15188, Jul. 30, 2020, 5 pgs.

Zheng, et al.; "Using Synthetic Audio to Improve the Recognition of Out-of-Vocabulary Words in End-to-End ASR Systems," https://arxiv.org/abs/2011.11564, Feb. 10, 2021, 5 pgs.

Thomas, et al.; "Integrating Text Inputs for Training and Adapting RNN Transducer ASR Models," https://arxiv.org/abs/2202.13155, Feb. 26, 2022, 5 pgs.

Chen, et al.; "MAESTRO: Matched Speech Text Representations Through Modality Matching,"https://arxiv.org/abs/2204.03409, Jul. 1, 2022, 5 pgs.

Sato, et al.; "Text-only Domain Adaptation Based on Intermediate CTC," Interspeech 2022, Sep. 2022, 5 pgs.

Meng, et al.; "Modular Hybrid Autoregressive Transducer," https://arxiv.org/abs/2210.17049, Feb. 17, 2023, 8 pgs.

Ueno, et al.; "Phone-informed Refinement of Synthesized Mel Spectrogram for Data Augmentation in Speech Recognition," in ICASSP, 2022, 5 pgs.

Hori, et al.; "Cycle-Consistency Training for End-to-End Speech Recognition," https://arxiv.org/abs/1811.01690, May 23, 2019, 5 pgs.

Wang, et al.; "Improving Speech Recognition Using Consistent Predictions on Synthesized Speech," ICASSP, 2020, 5 pgs.

Baskar, et al.; "Eat: Enhanced ASR-TTS for Self-Supervised Speech Recognition," https://arxiv.org/abs/2104.07474, Apr. 13, 2021, 5 pgs.

Ueno, et al.; "Data Augmentation for ASR Using TTS Via A Discrete Representation," 2021 IEEE Automatic Speech Recognition and Understanding Workshop (ASRU), 2021, 8 pgs.

Kurata, et al.; "Improving Customization of Neural Transducers by Mitigating Acoustic Mismatch of Synthesized Audio," in Interspeech, 2021, 5 pgs.

Lancucki; "FastPitch: Parallel Text-to-Speech with Pitch Prediction," https://arxiv.org/abs/2006.06873, Feb. 16, 2021, 5 pgs.

Kuchaiev, et al.; "NeMo: A Toolkit for Building AI Applications Using Neural Modules," https://arxiv.org/abs/1909.09577, Sep. 14, 2019, 8 pgs.

Lim, et al.; "Geometric GAN," https://arxiv.org/abs/1705.02894, May 9, 2017, 17 pgs.

Mescheder, et al.; "Which Training Methods for GANs Do Actually Converge," https://arxiv.org/abs/1801.04406, Jul. 31, 2018, 39 pgs.

Ba, et al.; "Layer Normalization," https://arxiv.org/abs/1607.06450, Jul. 21, 2016, 14 pgs.

Loshchilov, et al.; "Decoupled Weight Decay Regularization," https://arxiv.org/abs/1711.05101, Jan. 4, 2019, 19 pgs.

Loshchilov, et al.; "SGDR: Stochastic Gradient Descent With Warm Restarts," https://arxiv.org/abs/1608.03983, May 3, 2017, 16 pgs.

Bastianelli, et al.; "SLURP: A Spoken Language Understanding Resource Package," https://arxiv.org/abs/2011.13205, Nov. 26, 2020, 11 pgs.

Paul et al.; "The Design For The Wall Street Journal-Based CSR Corpus," in Speech and Natural Language Workshop, 1992, 6 pgs.

Park, et al.; "SpecAugment: A Simple Data Augmentation Method for Automatic Speech Recognition," https://arxiv.org/abs/1904.08779, Dec. 3, 2019, 6 pgs.

Jang, et al.; "UnivNet: A Neural Vocoder With Multi-Resolution Spectrogram Discriminators for High-Fidelity Waveform Generation," https://arxiv.org/abs/2106.07889, Jun. 15, 2021, 5 pgs.

Zen, et al.; "LibriTTS: A Corpus Derived from LibriSpeech for Text-to-Speech," https://arxiv.org/abs/1904.02882, Apr. 5, 2019, 7 pgs.

Panayotov, et al.; "LibriSpeech: An ASR Corpus Based on Public Domain Audio Books," in ICASSP, 2015, 5 pgs.

* cited by examiner

HYBRID LANGUAGE MODELS FOR CONVERSATIONAL AI SYSTEMS AND APPLICATIONS

CROSS-REFERENCE TO RELATED APPLICATIONS

This application claims the benefit of U.S. Provisional Application No. 63/417,627, filed on Oct. 19, 2022, the contents of which are hereby incorporated by reference in their entirety.

BACKGROUND

Automatic Speech Recognition (ASR) systems trained in an end-to-end manner may achieve better performance compared to traditional Hidden Markov Model (HMM)-Deep Neural Network (DNN) systems. However, customizing or tuning ASR models—especially for adaptation to a new domain—is a challenging task. A common approach for tuning an ASR model uses audio-text pairs from a new domain as training data. Generating the audio-text pairs for a particular domain often includes collecting and manually transcribing audio data, which can limit the availability of the data. Traditional HMM-DNN systems can be updated without using audio data by building a recognition graph and a statistical language model to improve performance for a new domain. End-to-end ASR systems could also benefit from using an external language model but less so than HMM-DNN systems while consuming significant computational resources.

Some approaches have integrated unpaired text into end-to-end ASR neural network systems for training or finetuning. However, these approaches require significant changes to the model architecture and to the training process. Further, approaches have used Text-To-Speech (TTS) models to synthesize audio from text to generate the audio-text pairs. However, these approaches are computationally expensive and result in synthetic audio that can cause reduced model performance due to mismatches with natural audio. To mitigate the mismatch, some approaches have trained the ASR and TTS models with additional objectives or trained an additional input block for the ASR system with a frozen ASR model.

SUMMARY

Embodiments of the present disclosure relate to hybrid language models for conversational artificial intelligence (AI) systems and applications. Systems and methods are disclosed that may allow for one or more machine learning models (MLMs) to be trained to convert audio data to textual data using textual input.

In contrast to conventional approaches, such as those described above, disclosed approaches may apply first textual data to one or more first MLMs to generate one or more intermediate audio representations (e.g., mel-spectrograms) and use the one or more intermediate audio representations and one or more second MLMs (e.g., an Automatic Speech Recognition (ASR) model) to generate output data indicating second textual data. One or more parameters of the one or more second MLMs may be updated using the output data and ground truth data. The one or more first MLMs may include a Text-To-Speech (TTS) model that has been trained to convert textual data inputs to intermediate audio representations. Disclosed approaches may allow for the textual data to be used when training and/or fine-tuning an ASR model.

Further aspects of the disclosure relate to using one or more generators from one or more Generative Adversarial Networks (GANs) to enhance (e.g., add detail to) one or more intermediate audio representations generated using one or more MLMs (e.g., a neural network). The enhanced intermediate audio representations may then be provided to the one or more second MLMs (e.g., the ASR model). The generator(s) may include generator blocks that receive an initial intermediate audio representation to sequentially generate an enhanced intermediate audio representation. For example, a downscaled and broadcasted intermediate audio representation may be used as an input and output to the generator blocks.

BRIEF DESCRIPTION OF THE DRAWINGS

The present systems and methods for hybrid language models for conversational AI systems and applications are described in detail below with reference to the attached drawing figures, wherein.

DETAILED DESCRIPTION

Figure 1:
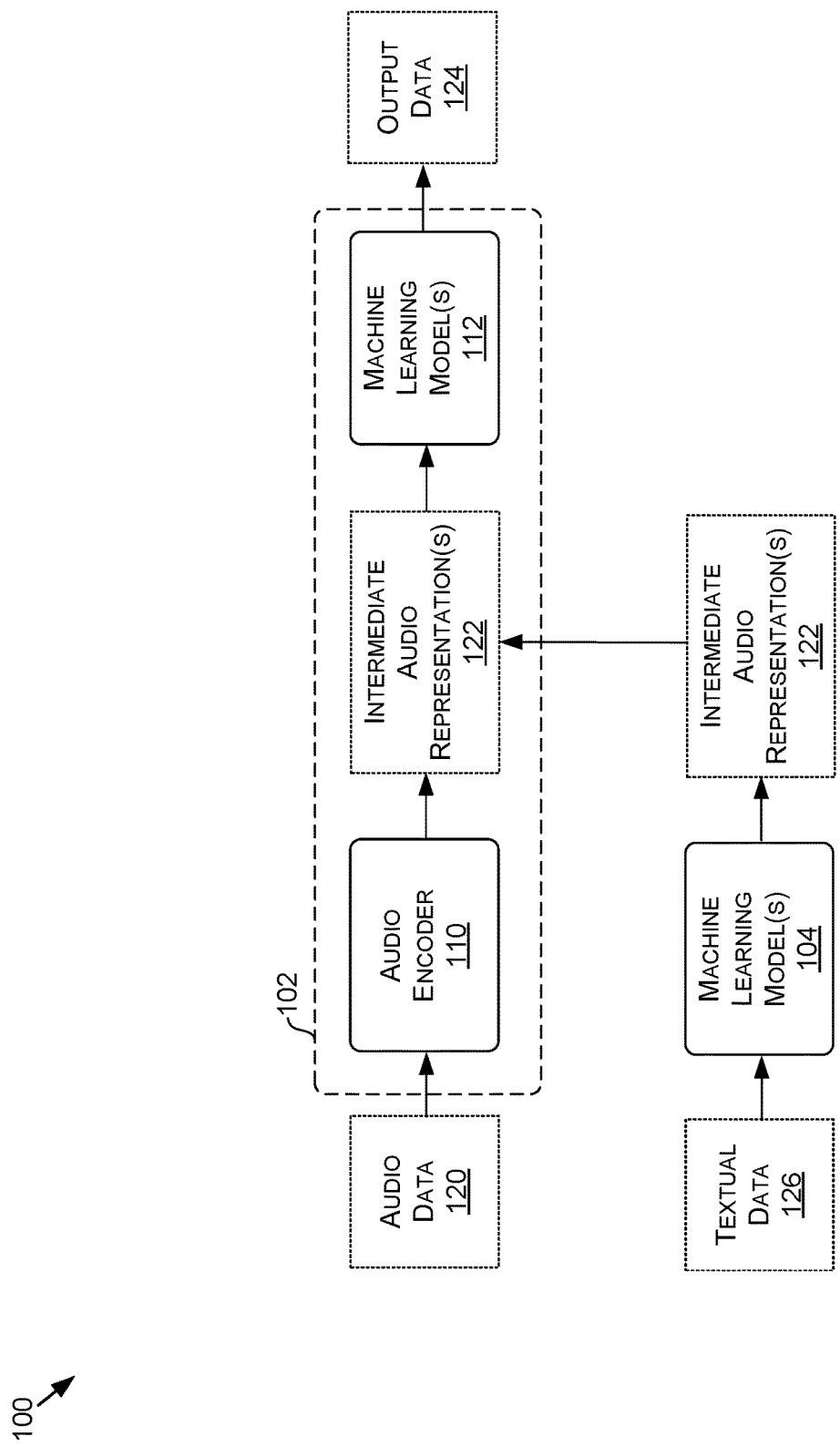
FIG. 1 is an example of a process for training or fine-tuning one or more machine learning models (MLMs) to convert audio data to textual data, in accordance with some embodiments of the present disclosure.

Embodiments of the present disclosure relate to hybrid language models for conversational artificial intelligence (AI) systems and applications. Systems and methods are disclosed that may allow for one or more machine learning models (MLMs) to be trained to convert audio data to textual data using textual input.

Disclosed approaches may apply first textual data to one or more first MLMs to generate one or more intermediate audio representations and use the one or more intermediate audio representations and one or more second MLMs to generate output data indicating second textual data. One or more parameters of the one or more second MLMs may be updated using the output data and ground truth data. In at least one embodiment, the one or more second MLMs include an Automatic Speech Recognition (ASR) model and the one or more parameters are updated to train the ASR model for an ASR pipeline used to convert audio data inputs to intermediate audio representations. In the ASR pipeline, the ASR model may be used to generate output data indicating textual data from the intermediate audio representations. By using the one or more first MLMs to generate intermediate audio representations from textual data, the textual data can be used when training and/or fine-tuning the one or more second MLMs (e.g., the ASR model) for use in the ASR pipeline. Additionally, or alternatively, disclosed approaches may be used to provide textual data as input to the ASR pipeline, in addition to or alternatively from the audio data at inference time (e.g., for textual language translation, summarization, etc.).

In at least one embodiment, the one or more first MLMs include a Text-To-Speech (TTS) model that has been trained in a TTS pipeline to convert textual data inputs to intermediate audio representations (e.g., mel-spectrograms). The TTS pipeline may include a vocoder to generate audio data outputs from the intermediate audio representations. By providing the intermediate audio representations to the one or more second MLMs (e.g., the ASR model), rather than the audio data outputs from the vocoder, the vocoder need not be used to train and/or deploy the one or more second MLMs (e.g., the ASR model). In at least one embodiment, the one or more first MLMs are trained to generate the intermediate audio representations using one or more of the same parameters that an audio encoder of the ASR pipeline uses to generate intermediate audio representations (e.g., as opposed to intermediate audio representation parameters typically used in TTS pipelines).

Further aspects of the disclosure relate to using one or more generators from one or more Generative Adversarial Networks (GANs) to enhance (e.g., add detail to) intermediate audio representations generated using one or more MLMs (e.g., a neural network). For example, the intermediate audio representations may be generated using the one or more first MLMs (e.g., a TTS model) and provided to the one or more generators. The enhanced intermediate audio representations may then be provided to the one or more second MLMs (e.g., the ASR model) or may otherwise be used for training and/or inferencing in one or more language data processing pipelines (e.g., for converting any form and/or type of language data to another form and/or type of language data).

In at least one embodiment, the one or more generators include multiple generator blocks that each receive an initial intermediate audio representation to sequentially generate an enhanced intermediate audio representation. For example, a downscaled and broadcasted intermediate audio representation may be used as an input and output to the generator blocks, which may result in the residual becoming spatially conditioned on the input intermediate audio representation to generate details thereof.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, autonomous or semi-autonomous machine applications, deep learning, environment simulation, object or actor simulation and/or digital twinning, data center processing, conversational AI, light transport simulation (e.g., ray tracing, path tracing, etc.), collaborative content creation for 3D assets, cloud computing, generative AI, (large) language models, and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, systems for performing generative AI operations, systems implementing—or for performing operations using—a large language model (LLM), and/or other types of systems.

With reference to FIG. 1, FIG. 1 is an example of a process 100 for training or fine-tuning one or more machine learning models (MLMs) to convert audio data to textual data, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of content streaming system 800 of FIG. 8, example computing device 900 of FIG. 9, and/or example data center 1000 of FIG. 10.

The process 100 may be implemented using, amongst additional or alternative components, a data converter 102 and a machine learning model(s) 104. The data converter 102 may include an audio encoder 110 and a machine learning model(s) 112. In the example shown, the data converter 102 is configured to convert audio data, such as audio data 120, to output data indicating textual data, such as output data 124. For example, the data converter 102 may include an Automatic Speech Recognition (ASR) model for end-to-end speech recognition.

As an overview, the MLM 104 may be used to adapt the data converter 102 to use another form of input data (e.g., text-only input), such as textual data 126, for training and/or finetuning the data converter 102 for audio-to-text conversion. For example, the MLM 104 (e.g., a TTS model) may be trained (e.g., in advance of the process 100) to infer an intermediate audio representation(s) 122 of the textual data 126 for use in training and/or finetuning the MLM 112 (e.g., an ASR model). In at least one embodiment, parameters of the MLM 104 are frozen throughout training and/or finetuning of the MLM 112.

In at least one embodiment, the MLM 104 is included in a text-to-spectrogram frontend added to the data converter 102. In training or finetuning, the data converter 102 is then able to use audio (e.g., a waveform or a spectrogram) and/or text as input for generating the output data 124. For example, where a waveform is provided as input to the data converter 102, the spectrogram (e.g., a mel-spectrogram or Mel-scale spectrogram) may be extracted using the audio encoder 110, and the spectrogram may then be passed to the MLM 112 (e.g., a neural network) according to a speech recognition pipeline. Where text is provided as input to the data converter 102, the spectrogram may be produced on-the-fly using the (e.g., frozen) MLM 104, and the spectrogram may then be processed using the MLM 112 according to the speech recognition pipeline. One or more parameters (e.g., weights and biases) of the MLM 112 may be adjusted using the output data 124 from the MLM 112 to train and/or fine-tune the MLM 112 to predict the correct text (e.g., using the textual data 126 or other data as ground truth data). Thus, the MLM 112 may be trained and/or fine-tuned using only sets of training data that include text input and text-based ground truth, or using fewer sets of training data that include audio input and text-based ground truth (or both audio and text inputs may be used with text-based ground truth).

In embodiments where the audio data 120 is used to train or fine-tune the MLM 112 (e.g., using an audio-text pair), the process 100 may include the data converter 102 receiving the audio data 120. The data converter 102 may receive the audio data 120 and convert the audio data 120 to the output data 124. Audio data may refer to any form of information that is represented using sound waves. Examples of audio data include language data (e.g., speech, such as an utterance), music data, noise data, and/or any other auditory phenomenon. Examples of representations for the audio data 120 include one or more of one or more waveforms (e.g., in digital form), spectrograms (e.g., mel-spectrograms), chromagrams, pitch curves, zero crossing rates, spectral centroids, spectral fluxes, envelopes, residuals or excitation signals, formants, wavelet transforms, autocorrelations, harmonic-to-noise ratios (HNRs), time-domain features, beat and tempo information, MIDI (Musical Instrument Digital Interface) data, cepstral data, or logarithmic amplitude representations.

In at least one embodiment, the data converter 102 receives an intermediate audio representation(s) of the audio data 120. In such examples, the data converter 102 may or may not use and/or include the audio encoder 110. For example, the data converter 102 may receive one or more of the intermediate audio representation(s) 122 as input and/or may convert and/or generate one or more of the intermediate audio representation(s) 122 from another intermediate audio representation(s). In various embodiments, the intermediate audio representation(s) 122 includes one or more spectrograms, such as one or more mel-spectrograms. However, the intermediate audio representation(s) 122 may additionally or alternatively include one or more other forms of intermediate audio representations of audio and/or speech data (e.g., continuous speech representations). Further examples of frequency-domain representations for the intermediate audio representation may include Constant-Q Transforms (CQTs), Short-Time Fourier Transforms (STFTs), linear Predictive Coding (LPC) coefficients, or Mel-Frequency Cepstral Coefficients (MFCCs). Further examples of the intermediate audio representation(s) 122 include a representation produced by and/or using one or more MLMs (e.g., neural networks), such as a wave2vec representation, a Hidden-unit Bidirectional Encoder Representations from Transformers (HuBERT) representation, a discrete representation produced by and/or using a neural codec, such as EnCodec, etc.

In various examples, the audio encoder 110 converts the audio data 120 to a mel-spectrogram using a multi-step algorithm that transforms a time-domain audio signal into a frequency-domain representation. The algorithm may include, by way of example and not limitation, dividing an input waveform into overlapping frames, time steps, or segments (e.g., spanning 10 milliseconds). These frames may be windowed using functions, such as a Hamming window function, to mitigate spectral leakage. An STFT may be applied to each windowed frame, generating a spectrogram that indicates how frequencies change over time. The magnitude of complex values in the spectrogram may be used to obtain a power spectrum. To create a mel-spectrogram, the power spectrum may be filtered across the frequency axis to capture energy within specific frequency ranges that better match human auditory perception. In at least one embodiment, the resulting mel-spectrogram is transformed to a logarithmic scale to compress the dynamic range.

The process 100 may include the audio encoder 110 providing the intermediate audio representation(s) 122 to the MLM(s) 112. The MLM 112 may receive the intermediate audio representation 122 from the audio encoder 110 and use the intermediate audio representation 122 to generate the output data 124 representing one or more predictions corresponding to and/or indicating textual data.

The MLM(s) 112 and/or other MLMs described herein may be include any suitable MLM. For example and without limitation, any of the various MLMs described herein may include one or more of any type(s) of machine learning model(s), such as a machine learning model using linear regression, logistic regression, decision trees, support vector machines (SVM), Naïve Bayes, k-nearest neighbor (Knn), K means clustering, control barrier functions, random forest, dimensionality reduction algorithms, gradient boosting algorithms, neural networks (e.g., one or more auto-encoders, convolutional, recurrent, transformer, perceptrons, Long/Short Term Memory (LSTM), Hopfield, Boltzmann, deep belief, deconvolutional, generative adversarial, liquid state machine, large language, etc. neural networks), and/or other types of machine learning model.

Further examples of MLMs, such as for the MLM(s) 112, include one or more conformer-based neural networks, one or more transducer models (e.g., a neural network implementing sequence-to-sequence transduction), one or more encoders (e.g., for the intermediate audio representation 122), one or more decoders (e.g., for decoding the output data 124 and/or other output data), one or more neural networks including one or more batch normalization layers (BatchNorm layers), and/or one or more neural networks including one or more layer normalization layers.

In at least one embodiment, the MLM 112 includes an end-to-end model that is trained to process spectrograms to generate a corresponding transcription. As non-limiting examples, the MLM 112 may include a larger (e.g., 100M parameters or more) and/or medium (e.g., greater than 30 M parameter) conformer-transducer model, that may employ a greedy decoding strategy without using an external language model. The encoder portion of the model may include a convolution-augmented transformer network, and the decoder portion of the model may include a single-layer LSTM network with, for example, 640 hidden units. The encoder portion may contain BatchNorm (BN) layers following the base architecture. Since BatchNorm layers in inference mode may use statistics accumulated during training time, and due to the mismatch between synthetic and natural audio, performance may suffer when using synthetic audio for finetuning. To account for this, the one or more BatchNorm layers may be replaced with one or more LayerNorm layers (which may normalize the input samples independently and alleviate the mismatch between inference and training modes), or the BatchNorm layer(s) may be fused (FusedBN) into a trainable projection initialized from the original BatchNorm parameters using a corresponding formula of the BatchNorm. This process may be similar to removing the BatchNorm layer but may allow for the use of a pretrained BatchNorm-based model for adaptation. In one or more embodiments, models with fused a BatchNorm layer may be used only in a finetuning scenario without resulting in any significant quality degradation between real and fused BatchNorm layers when using natural audio.

Textual data (e.g., indicated by the output data 124) may refer to any form of information that may be represented using written or typed language symbols and/or characters to form expressions, such as words, phrases, and sentences that convey linguistic meaning. Examples of representations for the textual data include various encoding schemes such as ASCII, Unicode, imaged-based, and other character encodings. Textual data representations may encompass natural language text, one or more emojis, one or more hashtags, one or more mentions, one or more URLs, one or more abbreviations, one or more punctuations, one or more characters, one or more words, one or more sub-words, one or more phonemes, one or more tokens, and more.

Where audio is used to train or fine-tune the MLM 112, the audio data 120 may be included in a dataset of audio recordings paired with corresponding textual transcriptions. Predictions made using the MLM 112 (e.g., the output data 124) may be compared to the corresponding ground truth using one or more loss functions. Through backpropagation, the parameters of the MLM 112 may be updated in a direction that minimizes the loss. The process 100 may occur using any number of epochs until criteria for terminating the training has been satisfied.

Where the textual data 126 is used to train or fine-tune the MLM 112 (e.g., in addition to or alternatively from the audio data 120), the process 100 may include the MLM(s) 104 receiving the textual data 126. The MLM(s) 104 may use the textual data 126 to generate one or more predictions corresponding to and/or indicating an intermediate audio representation(s) 122 that corresponds to the textual data 126. The textual data 126 may be in a form that is similar to or different from ground truth data used to train the MLM 112 and may be represented using an encoding scheme that is similar to or different from the ground truth data. In at least one embodiment, prior to the process 100, the MLM 104 may have been trained, at least in part, within a data converter of a TTS pipeline, such as a data converter 202 of FIG. 2A. Thus, in addition to or alternatively from the MLM 112 receiving an intermediate audio representation(s) 122 corresponding to the audio data 120 to generate the output data 124 for training and/or fine-tuning, the MLM 112 may receive an intermediate audio representation(s) 122 corresponding to the textual data 126 to generate the output data 124.

Where the MLM 112 receives an intermediate audio representation(s) 122 corresponding to the textual data 126, ground truth associated with the textual data 126 may be used for the output data 124 (e.g., the textual data 126 or other associated ground truth data may be used). For example, predictions made using the MLM 112 (e.g., corresponding to the output data 124) may be compared to corresponding ground truth data using one or more loss functions, which quantify the dissimilarity between predicted and actual textual outputs. Through backpropagation, one or more of the parameters of the MLM 112 may be updated in a direction that minimizes the loss. The process 100 may occur using any number of epochs. Further, one or more epochs may use audio data (e.g., and the audio encoder 110) to provide input to the MLM 112 and/or one or more epochs may use textual data (e.g., the MLM 104) to provide input to the MLM 112. In at least one embodiment, the audio data may be used, at least in part, for initial and/or pre-training (e.g., using a first training dataset) and the textual data may be used, at least in part, for fine-tuning and/or domain adaptation (e.g., using a second training dataset). For example, to adapt the MLM 112 to a new domain, the process 100 may be used such that text only data and/or audio-text pairs corresponding to a target domain may be used for training data and ground truth.

Ground truth data used in the process 100 may take a variety of forms, which may depend upon the tasks for which the MLM(s) 112 is being trained. Various examples of such tasks are described herein. For example, where the MLM 112 is being trained for ASR, ground truth data for the output data 124 may or may not match the textual data 126 (or a representation thereof). As non-limiting examples, the ground-truth data could be generated using different normalization, tokenization techniques, and/or punctuation than the textual data 126. Thus, for example, the textual data 126 could represent text with capitalization and punctuation, and the associated ground truth could represent the same textual content, but in lowercase and without punctuation. Further, where the MLM 112 is being trained for speech translation, the ground truth data could be in a different language than the input data. Thus, for example, the textual data 126 could be in a first language, and the associated ground truth could be in a second language that is different from the first language. As further examples, for speech summarization or other tasks, the ground truth data may represent significantly different textual content than the ground truth data.

To train the MLM 112 using the process 100, the output data 124 may or may not be converted into the textual data that is indicated by the output data 124. Whether the textual data is generated or not may depend upon the loss function being employed. As non-limiting examples, the textual data (or some other post-processed data) may not be generated or determined for Connectionist Temporal Classification (CTC) or Recurrent Neural Network Transducer (RNN-T) loss functions but may be determined for Minimum Word Error Rate (MWER) loss functions.

Figure 2:
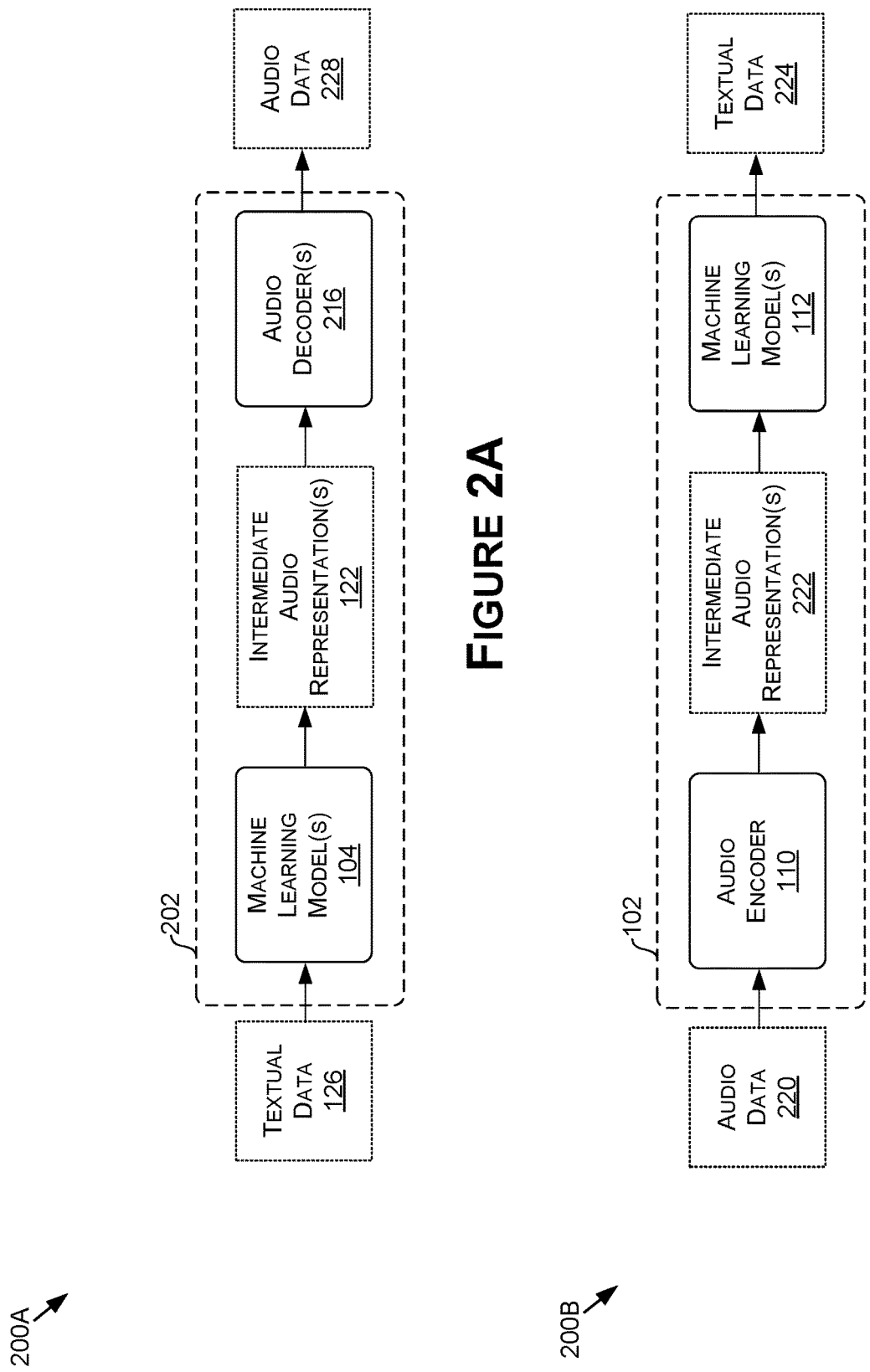
FIG. 2A is an example of a process for converting textual data to audio data using one or more MLMs, in accordance with some embodiments of the present disclosure.
FIG. 2B is an example of a process for converting audio data to textual data using one or more MLMs, in accordance with some embodiments of the present disclosure.

Referring now to FIG. 2A, FIG. 2A an example of a process 200A for converting textual data to audio data using the MLM(s) 104, in accordance with some embodiments of the present disclosure. The process 200A may be performed using the data converter 202 of a TTS pipeline. For example, the process 200A may be performed, for example, using the MLM 104 trained, within the data converter 202, to use the textual data 126 (or other textual data) to generate one or more predictions corresponding to and/or indicating audio data 228. The audio data 228 may be in a form that is similar to or different from the audio data 120 and may be represented similar to or different from the audio data 120. After training the MLM 104 (e.g., within the data converter 202) for the process 200A, the MLM 104 may be implemented in the process 100 of FIG. 1.

The process 200A may include the data converter 202 receiving the textual data 126. The MLM(s) 104 may use the textual data 126 to generate one or more predictions corresponding to and/or indicating the intermediate audio representation(s) 122 that corresponds to the textual data 126. The process 200A may further include the MLM 104 providing the intermediate audio representation(s) 122 to an audio decoder(s) 216. The audio decoder(s) 216 may receive the intermediate audio representation 122 from the MLM 104 and decode the intermediate audio representation 122 to generate the audio data 228. In at least one embodiment, the audio decoder(s) 216 includes one or more MLMs trained to decode the intermediate audio representation 122 to generate one or more predictions corresponding to and/or indicating the audio data 228. In at least one embodiment, the audio decoder(s) 216 is implemented, at least in part, using a vocoder.

The data converter 202 can be used to generate the audio data 120 in the process 100 of FIG. 1, thereby allowing for the textual data 126 to be used as input for training the MLM 112. However, the audio decoder 216 can consume significant computational resources. By providing the intermediate audio representation 122 generated using the MLM 104 as input to the data converter 102, the audio decoder 216 need not be used in the process 100, thereby saving the computational resources.

By way of example and not limitation, the MLMs within the data converter 202 may be trained end-to-end using a training dataset comprising text-audio pairs. The training dataset, for example, may be derived from a collection of audiobooks read aloud by human speakers with corresponding text from the audiobooks and contain a diverse range of textual content, which may allow the MLM 104 to handle different linguistic patterns, vocabulary, and speaking styles. In embodiments where the MLM 104 is trained to generate one or more spectrograms (e.g., mel-spectrograms), the ground truth intermediate audio representations may be generated using parameters (e.g., step and window parameters) used in frequency-domain representations for ASR models (e.g., one or more of the same parameters as the audio encoder 110). For example, the MLM 104 may be trained using a smaller step size than is typically used for training TTS models, such as less than or equal to 10 milliseconds. Thus, the parameters of the intermediate audio representations may be configured for ASR applications.

Referring now to FIG. 2B, FIG. 2B is an example of a process 200B for converting audio data to textual data using the MLM(s) 112, in accordance with some embodiments of the present disclosure. The process 200B may be performed, for example, using the data converter 102 after the MLM 112 is trained and/or fine-tuned using the process 100 of FIG. 1. The process 200B may include the data converter 102 receiving audio data 220. The audio data 220 may be in a form that is similar to or different from the audio data 120 and may be represented similar to or different from the audio data 120. The audio encoder 110 may generate and/or determine an intermediate audio representation(s) 222 of the audio data 220. For example, the audio encoder 110 may determine the intermediate audio representation 222 using a same or similar approach as used to determine the intermediate audio representation 122 in the process 100. In other examples, a different audio encoder 110 may be used or the intermediate audio representation(s) 222 may be received directly by the data converter 102.

The process 200B further includes the audio encoder 110 providing the intermediate audio representation(s) 222 to the MLM(s) 112. The MLM 112 may use the intermediate audio representation 122 to generate one or more predictions corresponding to and/or indicating textual data 224, where the predictions may be similar to the output data 124 of FIG. 1.

The textual data 224 may be consumed by any of a variety of downstream applications, services, and/or machine learning models. For example, the textual data 224 may be used by one or more computing systems to perform one or more operations for, by way of example, one or more of transcription, diarization, captioning and/or subtitling, voice command control, audio content indexing, audio content analysis, audio data annotation for training data, content summarization, machine control, machine locomotion, machine driving, synthetic data generation, model training, perception, augmented reality, virtual reality, mixed reality, robotics, security and surveillance, autonomous or semi-autonomous machine applications, deep learning, environment simulation, object or actor simulation and/or digital twinning, data center processing, conversational AI, light transport simulation (e.g., ray tracing, path tracing, etc.), collaborative content creation for 3D assets, cloud computing, generative AI, (large) language models, and/or any other suitable applications.

As described herein, the MLM 112 may be trained to perform ASR. In various examples, the MLM 112 may be trained such that the textual data 224 corresponds to a textual representation or encoding of the audio data 220. However, the MLM 112 may be trained for any of a variety of tasks involving generating representations and/or indications of textual data from audio data. Examples include content summarization, language conversion (e.g., spoken English to written Russian), content classification, and/or any other task where audio-text pairs may be used for training. While in some examples the MLM 104 may not be used in deployment, one or more embodiments may use the MLM 104 to provide an intermediate audio representation 222 based on textual data, similar to the process 100 of FIG. 1.

Returning to FIG. 2A, the data converter 202 may include a transformer-based multi-speaker model—such as Fast-Pitch—that may produce different voices. Due to the blurriness of conventional neural text-to-speech models, a generative adversarial network (a generator or enhancer thereof) may be used to eliminate or reduce the discrepancy between the generated and ground truth spectrograms. The enhancer may be trained to add fine details to blurry synthesized spectrograms, to allow the enhanced spectrograms to match the ground truth spectrograms more closely. While the generator or enhancer is described with respect to FIG. 2A, the disclosure provides for the generator or enhancer to be used in any system that generates an intermediate audio representation of audio data using one or more machine learning models (e.g., a neural network).

Figure 3:
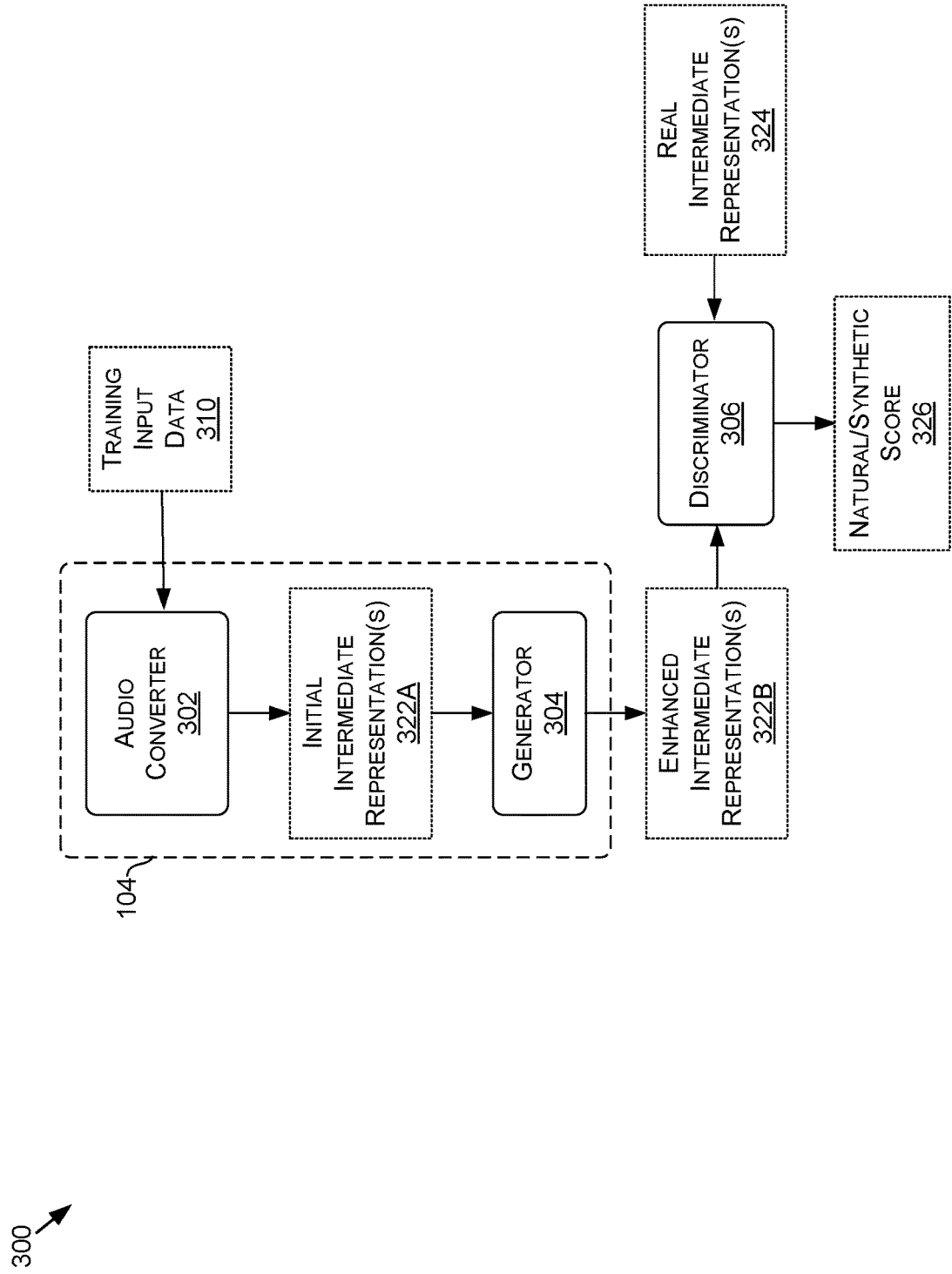
FIG. 3 is an example of a process for training one or more MLMs to generate an enhanced intermediate audio representations using a Generative Adversarial Network (GAN), in accordance with some embodiments of the present disclosure.

FIG. 3 is an example of a process 300 for training the MLM 104 to generate the intermediate audio representation(s) 122 using a Generative Adversarial Network (GAN), in accordance with some embodiments of the present disclosure. In the example of FIG. 3, the MLM(s) 104 includes an audio converter 302 and a generator 304. The audio converter 302 (e.g., a transformer-based multi-speaker model) may include one or more MLMs that is trained using the process 300 to generate (e.g., using the audio data 220) one or more predictions corresponding to and/or indicating an initial intermediate audio representation(s) 322A. For example, the training may use ground truth intermediate audio representations generated using any of the various approaches described herein.

In one or more embodiments, the MLM 104 of FIG. 1 may include the audio converter 302 without the generator 304. However, the initial intermediate audio representation(s) 322A may be blurry or otherwise lack fine details. Thus, the generator 304 (e.g., from a GAN) may be included in the MLM 104 to generate, using the initial intermediate audio representation(s) 322A, one or more predictions corresponding to and/or indicating an enhanced intermediate audio representation(s) 322B (e.g., to add detail to the initial intermediate audio representation(s) 322A). The enhanced intermediate audio representation(s) 322B may then be provided to the data converter 102 of FIG. 1 in the process 100 (e.g., the enhanced intermediate audio representation(s) 322B may be included in the intermediate audio representation(s) 122 in FIG. 1).

During training, the process 300 may include the audio converter 302 being used to generate, using the training input data 310 (e.g., audio data), blurry intermediate audio representations (e.g., spectrograms). The blurry intermediate audio representations may be generated based at least on resynthesizing TTS training data through the audio converter 302 (e.g., a corresponding transformer-based multi-speaker model) using ground truth $F_0$ and speaker IDs. Blurry initial intermediate audio representations 322A and natural intermediate audio representations 324 may be provided to a discriminator 306 to generate a natural/synthetic score 326 for use in updating parameters of at least the generator 304 (e.g., parameters of the audio converter 302 may be frozen after being trained without the generator 304). When updating the parameters using the natural/synthetic score 326, blurry initial intermediate audio representations 322A that are passed through the generator 304 may be considered "synthetic" and natural intermediate audio representations 324 may be considered "natural" spectrograms.

Figure 4:
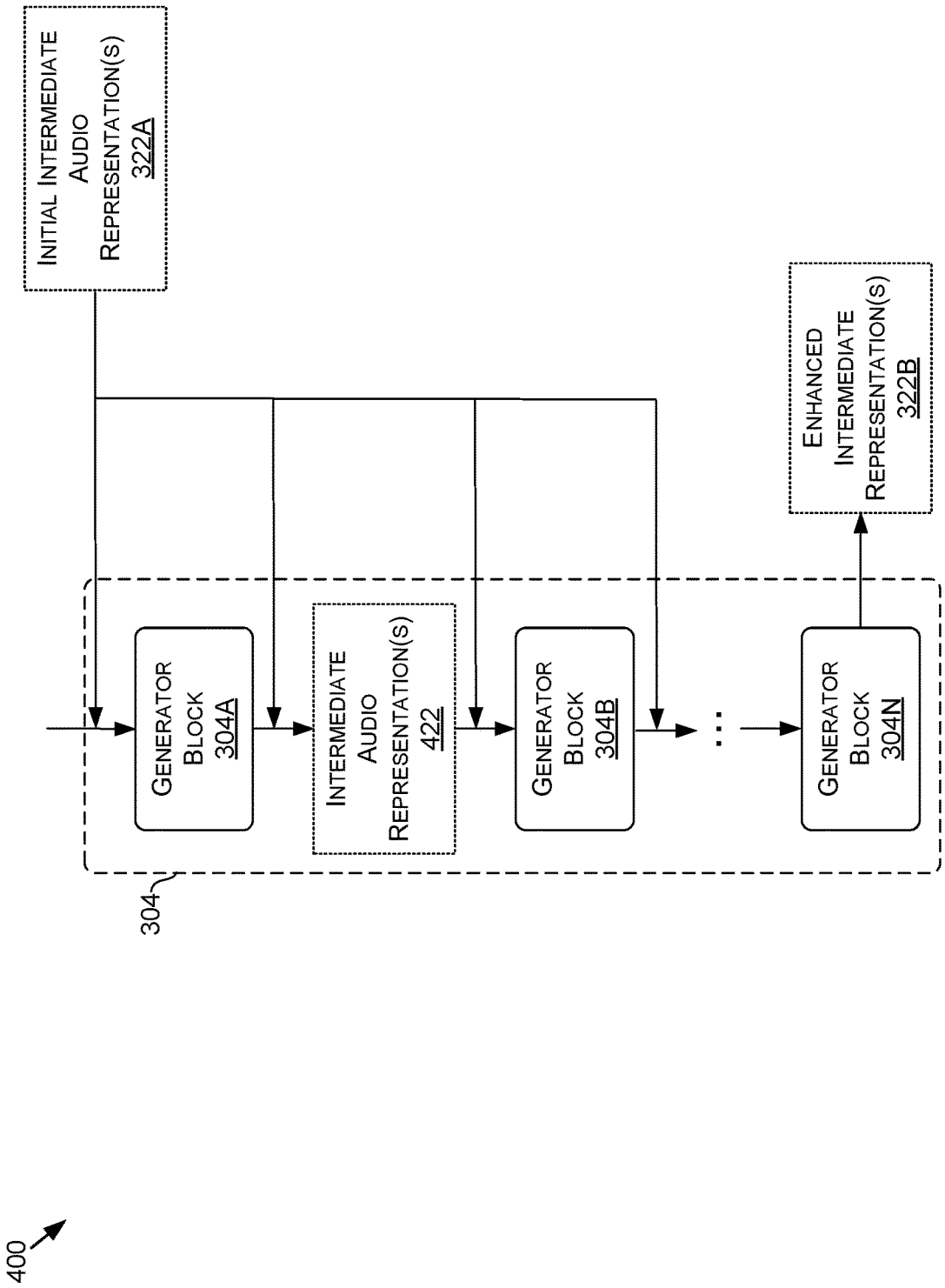
FIG. 4 is an example of a process for training one or more MLMs to generate intermediate audio representations using generator blocks, in accordance with some embodiments of the present disclosure.

Referring now to FIG. 4, FIG. 4 is an example of a process 400 for training one or more MLMs to generate intermediate audio representations using generator blocks, in accordance with some embodiments of the present disclosure. The process 400 may be included in the process 300 of FIG. 3 and indicates that the generator 304 may include any number of generator blocks, such as generator blocks 304A and 304B through 304N. As indicated in FIG. 4, the initial intermediate audio representation(s) 322A may be provided to one or more of the generator blocks 304A through 304N so the generator 304 becomes spatially conditioned on the input intermediate audio representation and learns to (e.g., only) generate details.

As a non-limiting example, an adversarially trained unconditional generative model for images (e.g., a modified version of StyleGAN2 from NVIDIA Corporation) may be used as a base architecture for the generator 304. The process 400 may begin with a small random "image" (e.g., 4×4), randomly initialized and frozen. The image may then be passed through a number of up-sampling and convolutional layers. Weights of the convolutional layers may be modulated by random noise from a learned style manifold. The image may then be generated progressively with each generator block 304A through 304N adding details to the 2λ up-sampled image from the previous block (e.g., corresponding to an intermediate audio representation(s) 422).

The generator 304 may be modified to operate on 80-band mel-spectrograms of arbitrary length, L, which may be treated as grayscale images. The network may start from a 5*L/16 fixed random image and may output an 80*L detailed spectrogram. As described herein, the initial intermediate audio representation(s) 322A may be provided to one or more of the generator blocks 304A through 304N. For example, a downscaled and broadcasted spectrogram may be added as an input and output to each generator block. As a result, the process 400 for the residual may become spatially conditioned on the input spectrogram, and the network may learn to (e.g., only) generate details. In the discriminator 306, the time axis may be averaged across prior to projecting to logits.

As non-limiting examples, the hyperparameters of the generator 304 may include 192 latent dimensions, a depth of 4, a network capacity of 16, and an upper bound on the number of feature maps in convolutional layers of 192. As a result, the generator 304 may have 3.5 M parameters, and the discriminator 306 may have 4.5 M parameters. The process 300 may include alternating between training the discriminator 306 and the generator 304. Both may be trained using, as a non-limiting example, hinge loss. Additionally, gradient penalty loss may be used, e.g., every four steps of the discriminator 306. An Adam optimizer may be used, with $\beta_1=0.5$, $\beta_2=0.9$, a learning rate of $2*10^{-4}$, and training for 20 epochs/steps. A batch size of 16 may be used.

In at least one embodiment, a consistently loss may be used during training of the generator 304. The consistency loss may be based at least on an L1 distance (e.g., absolute difference) between natural and generated spectrograms, both down-sampled 4λ along the frequency axis. This loss may have a weight of 0.1, as a non-limiting example. Using the consistency loss may reduce or eliminate extra sounds or noise generated by the generator 304.

Figure 5:
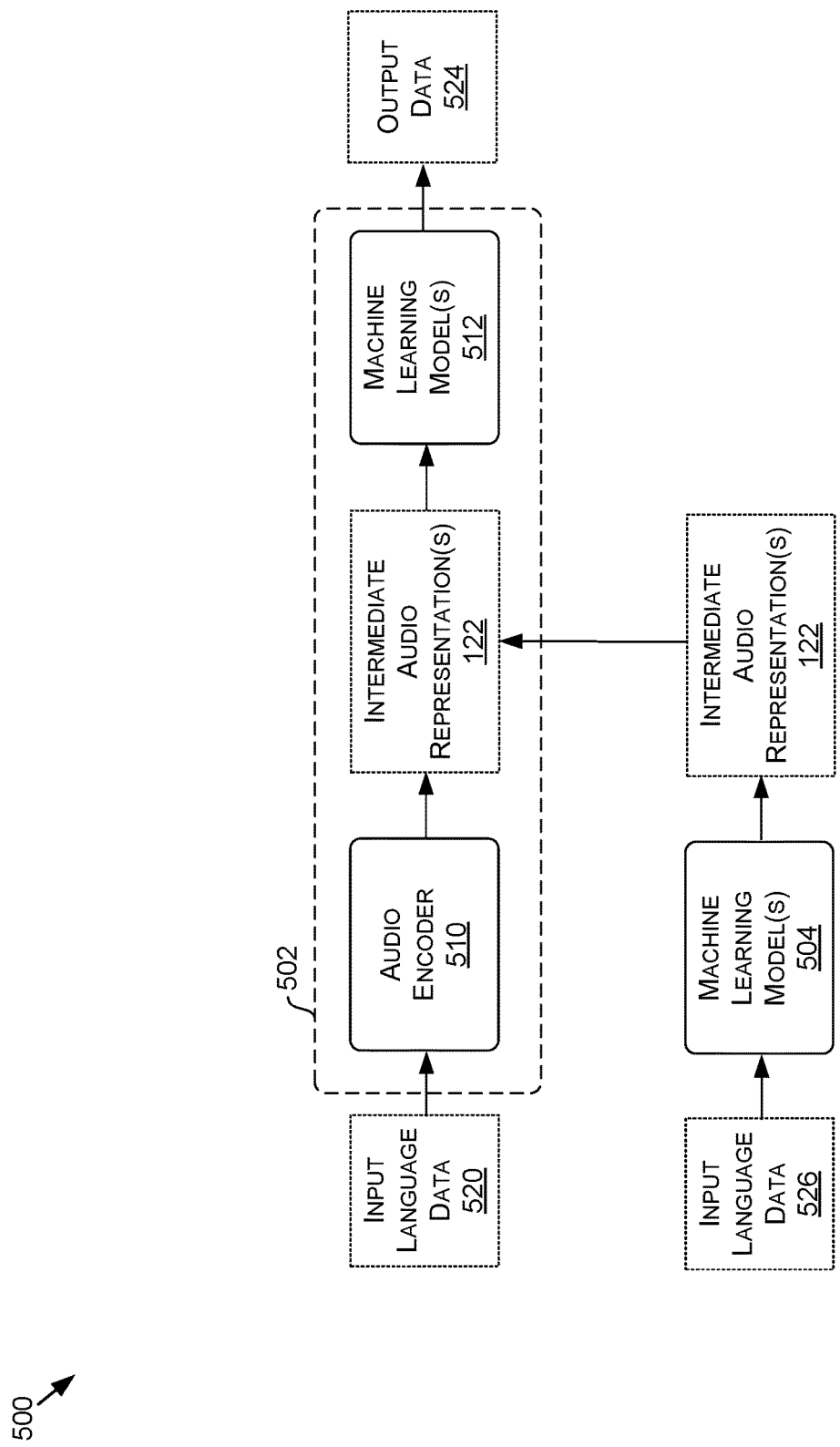
FIG. 5 is an example of a process for training one or more machine learning models (MLMs) to convert input language data to output language data, in accordance with some embodiments of the present disclosure.

Referring now to FIG. 5, FIG. 5 is an example of a process 500 for training one or more machine learning models (MLMs) to convert input language data to output language data, in accordance with some embodiments of the present disclosure. The process 500 may be similar to the process 100, with the audio data and textual data more generally being any of a variety of types and/or forms of language data (and/or audio or textual data). For example, FIG. 5 shows input language data 520, input language data 526, and output data 524, which may correspond to any combination of one or more types and/or forms of language data. Examples of language data include textual data and/or audio data representing linguistic content. For example, language data may refer to text and/or spoken expressions in the form of words, sentences, paragraphs, or longer forms of communication.

In at least one embodiment, the MLM 512 may be trained similar to the MLM 112 and for any of a variety of tasks, which may involve generating the output data 524 to indicate output language data from the input language data 520. For example, the MLM 512 may be trained for content summarization, language conversion (e.g., spoken or written English to spoken or written Russian), content classification, and/or any other task where output data 524 may be determined using the input language data 520.

The MLM 504 may be trained to generate the intermediate audio representation 122 (or the intermediate audio representation 222) similar to the MLM 104 and may use any combination of input language data or output language data described herein. The MLM 504 may or may not include the generator 304, as described herein. Further, an audio encoder 510 is shown, which may be similar to or different from the audio encoder 110 of FIG. 1. In at least one embodiment, the audio encoder 510 includes an MLM and/or generator 304 similar to the MLM(s) 504. Where the type and/or form of inputs and/or outputs are different from the process 100, any of the various components in the process 500 may be modified accordingly. Similarly, the MLM 512, once trained, may be deployed in a similar or different manner as the MLM 112. Thus, for example, the generator 304 may be used to enhance intermediate audio representation (e.g., frequency-domain representations) for audio to audio, audio to text, text to audio, and/or text to text applications during training and/or deployment.

Figure 6:
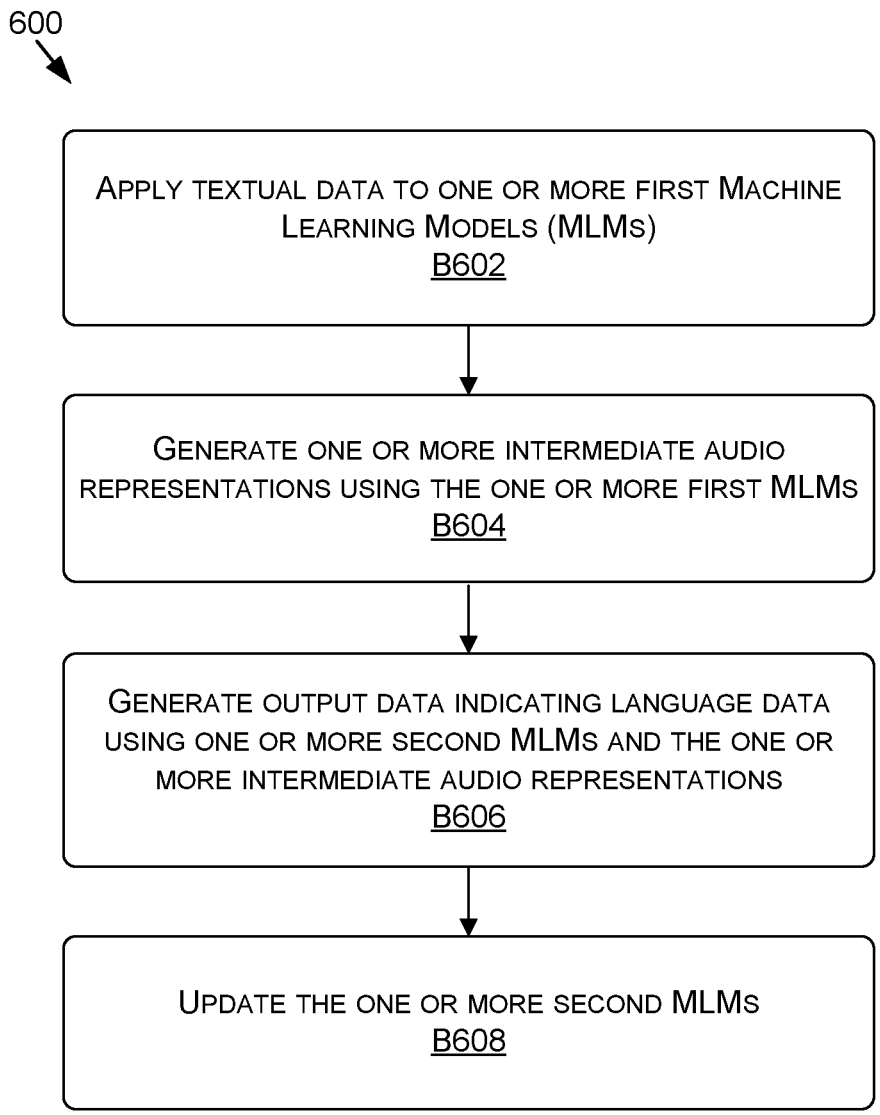
FIG. 6 is a flow diagram showing a method for training a machine learning model using textual data, in accordance with some embodiments of the present disclosure.
Figure 7:
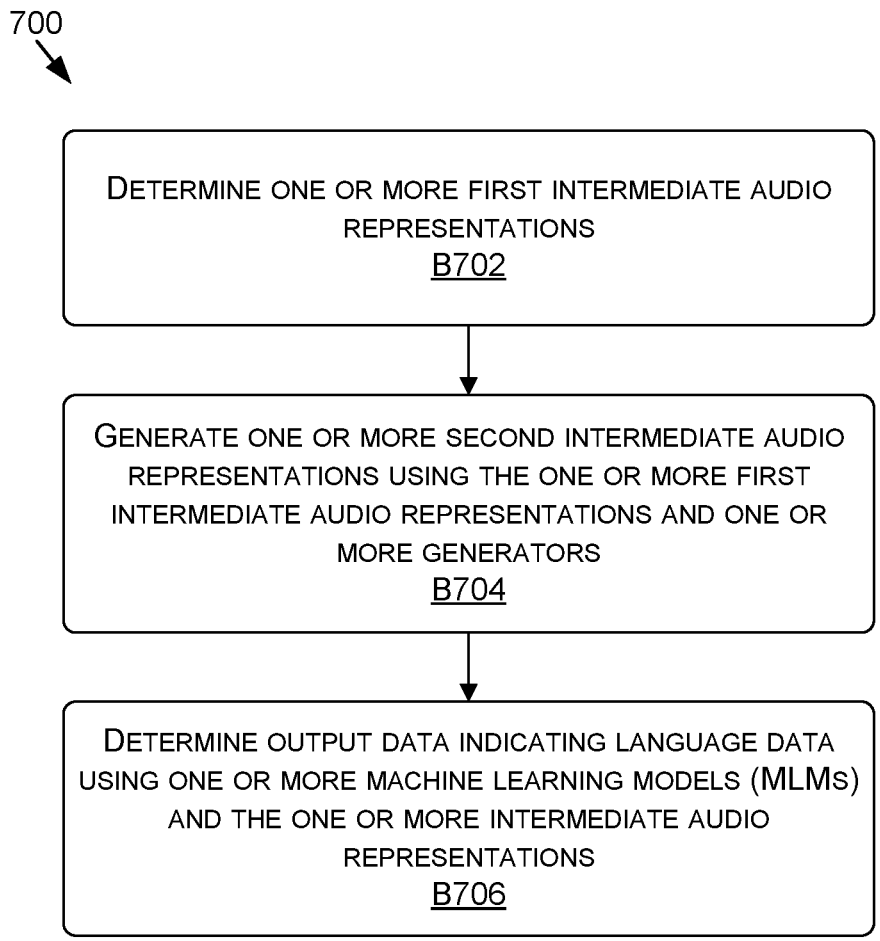
FIG. 7 is a flow diagram showing a method for determining output data indicating language data using a generator of a generative adversarial network, in accordance with some embodiments of the present disclosure.

Now referring to FIGS. 6 and 7, each block of method 600, method 700, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the methods are described, by way of example, with respect to the process 100 of FIG. 1. However, these methods may additionally or alternatively be executed by any one system, or any combination of systems, including, but not limited to, those described herein.

FIG. 6 is a flow diagram showing a method 600 for training a machine learning model using textual data, in accordance with some embodiments of the present disclosure. The method 600, at block B602, includes applying textual data to one or more first MLMs. For example, the textual data 126 may be applied to the MLM(s) 104.

At block B604, the method 600 includes generating one or more intermediate audio representations using the one or more first MLMs. For example, the intermediate audio representation(s) 122 may be generated using the MLM(s) 104 and the textual data 126.

At block B606, the method 600 includes generating output data indicating language data using one or more second MLMs and the one or more intermediate audio representations. For example, the MLM(s) 112 and the intermediate audio representations 122 may be used to generate the output data 124.

At block B608, the method 600 includes updating the one or more second MLMs. For example, the one or more parameters of the MLM(s) 112 may be updated based at least on the output data 124 and ground truth data associated with the textual data 126. In at least one embodiment, the method 600 is used to train (e.g., train, pre-train, or fine-tune) the MLM(s) 112 for use in performing one or more ASR operations.

FIG. 7 is a flow diagram showing a method 700 determining output data indicating language data using a generator of a generative adversarial network, in accordance with some embodiments of the present disclosure. The method 700, at block B702, includes determining one or more first intermediate audio representations. For example, the audio converter 302 may be used to determine the initial intermediate audio representation(s) 322A, which may correspond to at least one of first audio data or first textual data provided to the audio converter 302 (e.g., the input language data 526).

At block B704, the method 700 includes generating one or more second intermediate audio representations using the one or more first intermediate audio representations and one or more generators. For example, the generator 304 and the initial intermediate audio representation(s) 332A may be used to generate the enhanced intermediate audio representation(s) 322B (e.g., corresponding to the intermediate audio representation 122).

At block B706, the method 700 includes determining output data indicating language data using one or more MLMs and the one or more second intermediate audio representations. For example, output data indicating at least one of second audio data or second textual data (e.g., the output data 524) may be determined using the MLM(s) 512 and the enhanced intermediate audio representation(s) 322B. The output data may be used to update one or more parameters of the MLM(s) 512 and/or to perform one or more language-based operations (e.g., to effectuate any of the various applications described herein).

Example Content Streaming System

Figure 8:
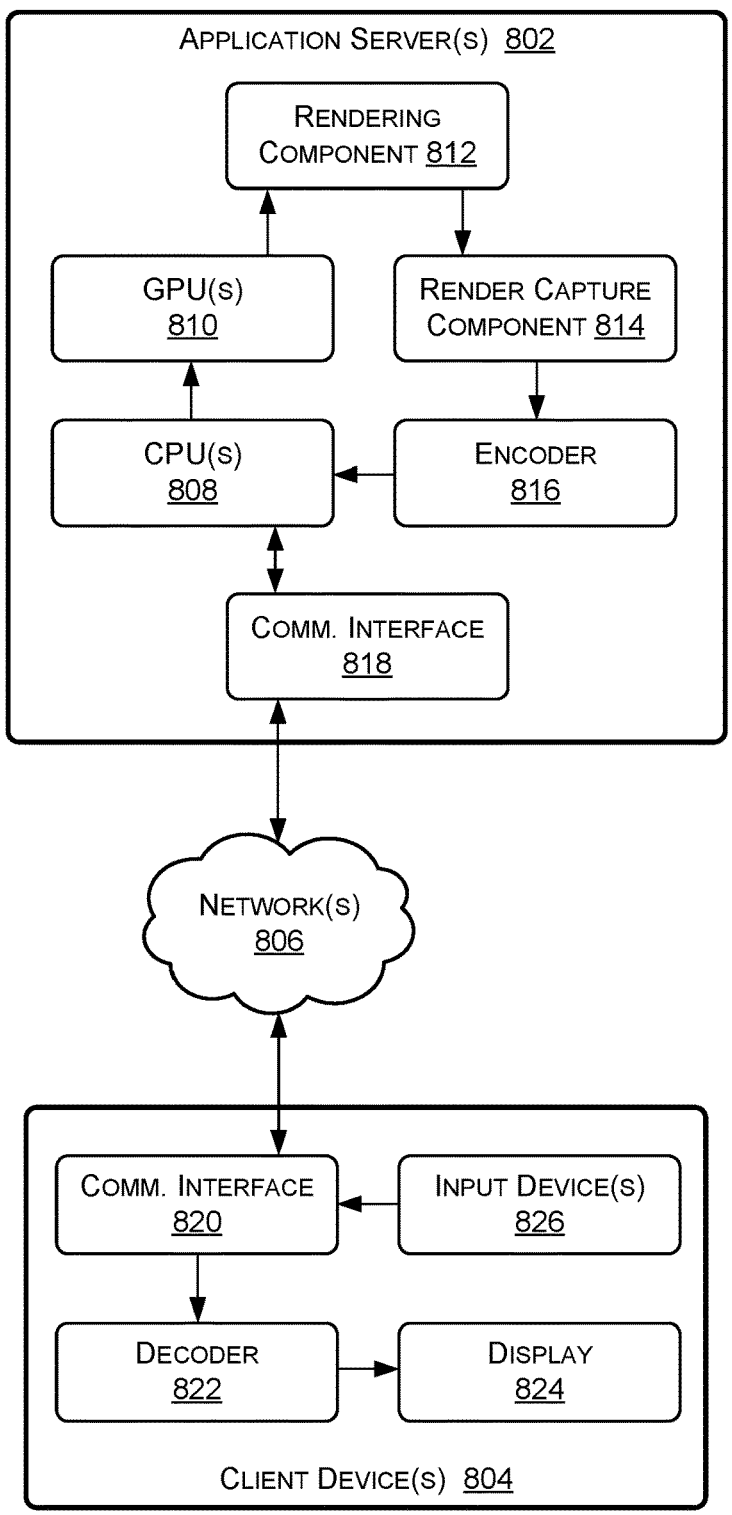
FIG. 8 is a block diagram of an example content streaming system suitable for use in implementing some embodiments of the present disclosure.

Now referring to FIG. 8, FIG. 8 is an example system diagram for a content streaming system 800, in accordance with some embodiments of the present disclosure. FIG. 8 includes application server(s) 802 (which may include similar components, features, and/or functionality to the example computing device 900 of FIG. 9), client device(s) 804 (which may include similar components, features, and/or functionality to the example computing device 900 of FIG. 9), and network(s) 806 (which may be similar to the network(s) described herein). In some embodiments of the present disclosure, the system 800 may be implemented. The application session may correspond to a game streaming application (e.g., NVIDIA GeForce NOW), a remote desktop application, a simulation application (e.g., autonomous or semi-autonomous vehicle simulation), computer aided design (CAD) applications, virtual reality (VR), augmented reality (AR), and/or mixed reality (MR) streaming applications, deep learning applications, and/or other application types.

In the system 800, for an application session, the client device(s) 804 may only receive input data in response to inputs to the input device(s), transmit the input data to the application server(s) 802, receive encoded display data from the application server(s) 802, and display the display data on the display 824. As such, the more computationally intense computing and processing is offloaded to the application server(s) 802 (e.g., rendering—in particular ray or path tracing—for graphical output of the application session is executed by the GPU(s) of the game server(s) 802). In other words, the application session is streamed to the client device(s) 804 from the application server(s) 802, thereby reducing the requirements of the client device(s) 804 for graphics processing and rendering.

For example, with respect to an instantiation of an application session, a client device 804 may be displaying a frame of the application session on the display 824 based on receiving the display data from the application server(s) 802. The client device 804 may receive an input to one of the input device(s) and generate input data in response. The client device 804 may transmit the input data to the application server(s) 802 via the communication interface 820 and over the network(s) 806 (e.g., the Internet), and the application server(s) 802 may receive the input data via the communication interface 818. The CPU(s) may receive the input data, process the input data, and transmit data to the GPU(s) that causes the GPU(s) to generate a rendering of the application session. For example, the input data may be representative of a movement of a character of the user in a game session of a game application, firing a weapon, reloading, passing a ball, turning a vehicle, etc. The rendering component 812 may render the application session (e.g., representative of the result of the input data) and the render capture component 814 may capture the rendering of the application session as display data (e.g., as image data capturing the rendered frame of the application session). The rendering of the application session may include ray or path-traced lighting and/or shadow effects, computed using one or more parallel processing units—such as GPUs, which may further employ the use of one or more dedicated hardware accelerators or processing cores to perform ray or path-tracing techniques—of the application server(s) 802. In some embodiments, one or more virtual machines (VMs)—e.g., including one or more virtual components, such as vGPUs, vCPUs, etc.—may be used by the application server(s) 802 to support the application sessions. The encoder 816 may then encode the display data to generate encoded display data and the encoded display data may be transmitted to the client device 804 over the network(s) 806 via the communication interface 818. The client device 804 may receive the encoded display data via the communication interface 820 and the decoder 822 may decode the encoded display data to generate the display data. The client device 804 may then display the display data via the display 824.

Example Computing Device

Figure 9:
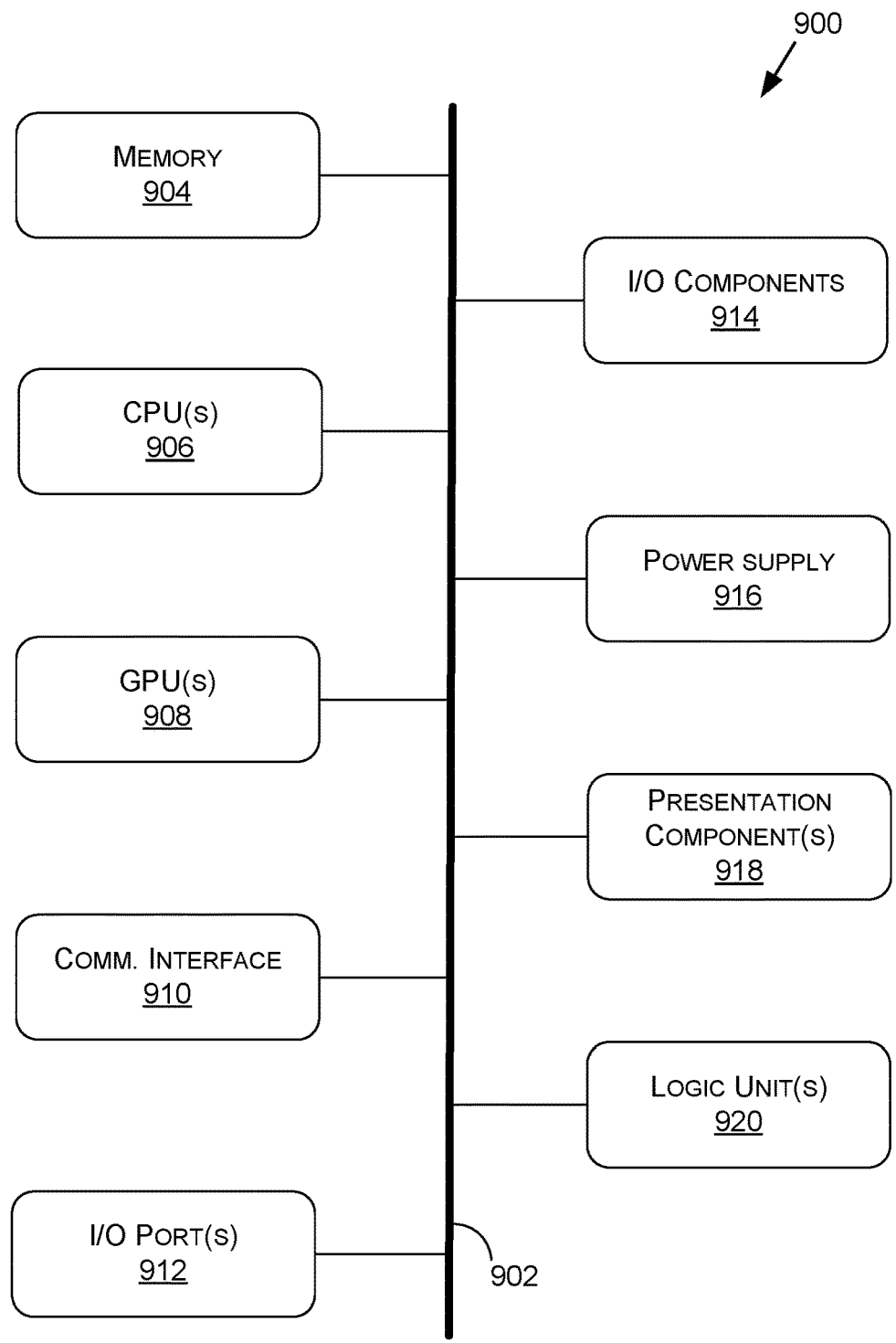
FIG. 9 is a block diagram of an example computing device suitable for use in implementing some embodiments of the present disclosure.

FIG. 9 is a block diagram of an example computing device(s) 900 suitable for use in implementing some embodiments of the present disclosure. Computing device 900 may include an interconnect system 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, one or more presentation components 918 (e.g., display(s)), and one or more logic units 920. In at least one embodiment, the computing device(s) 900 may comprise one or more virtual machines (VMs), and/or any of the components thereof may comprise virtual components (e.g., virtual hardware components). For non-limiting examples, one or more of the GPUs 908 may comprise one or more vGPUs, one or more of the CPUs 906 may comprise one or more vCPUs, and/or one or more of the logic units 920 may comprise one or more virtual logic units. As such, a computing device(s) 900 may include discrete components (e.g., a full GPU dedicated to the computing device 900), virtual components (e.g., a portion of a GPU dedicated to the computing device 900), or a combination thereof.

Although the various blocks of FIG. 9 are shown as connected via the interconnect system 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The interconnect system 902 may represent one or more links or busses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information, and which may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory or may share memory with other GPUs.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 910 may include one or more receivers, transmitters, and/or transceivers that enable the computing device 900 to communicate with other computing devices via an electronic communication network, included wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 920 and/or communication interface 910 may include one or more data processing units (DPUs) to transmit data received over a network and/or through interconnect system 902 directly to (e.g., a memory of) one or more GPU(s) 908.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, DPUs, etc.), and output the data (e.g., as an image, video, sound, etc.).

Example Data Center

Figure 10:
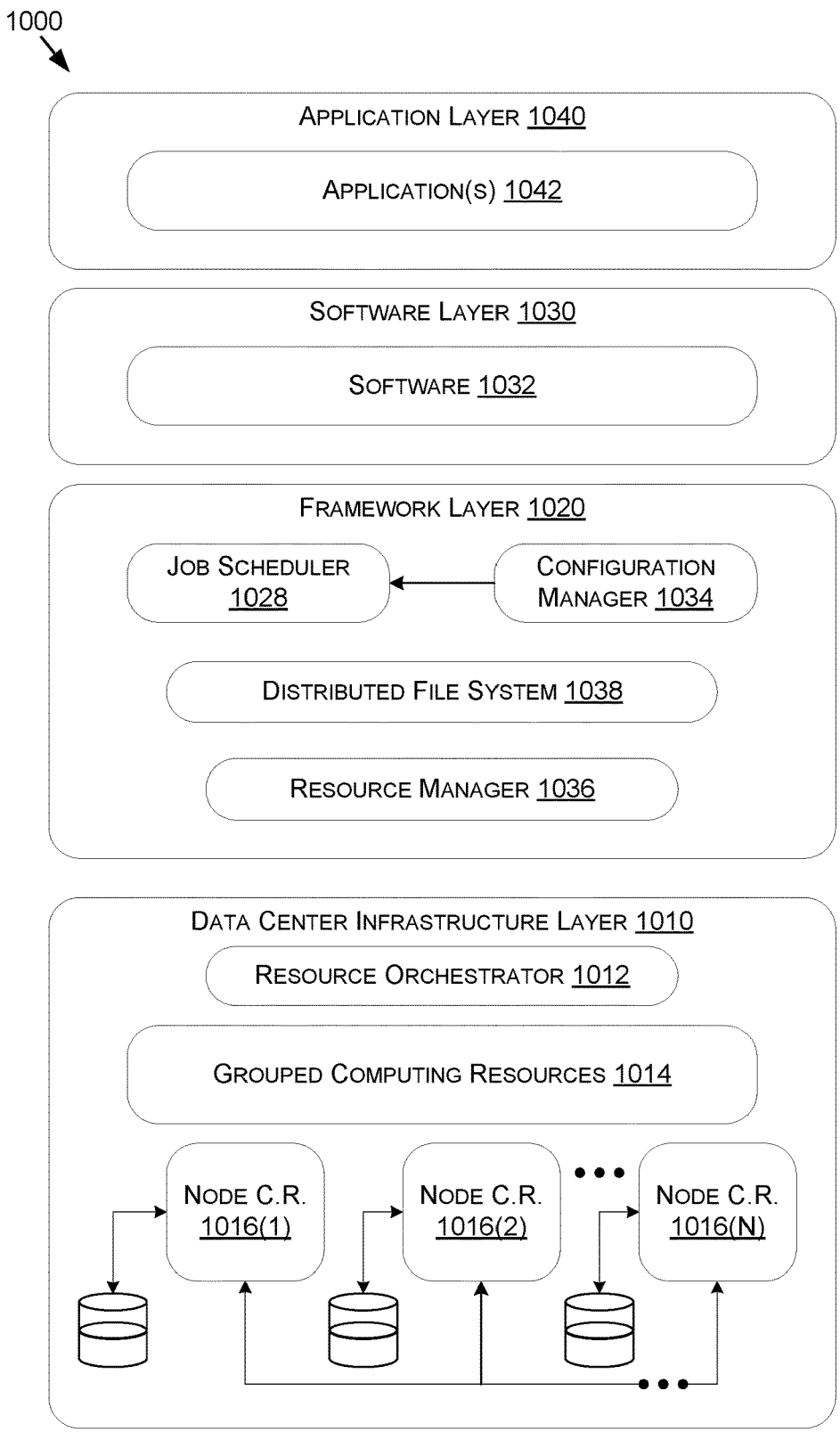
FIG. 10 is a block diagram of an example data center suitable for use in implementing some embodiments of the present disclosure.

FIG. 10 illustrates an example data center 1000 that may be used in at least one embodiments of the present disclosure. The data center 1000 may include a data center infrastructure layer 1010, a framework layer 1020, a software layer 1030, and/or an application layer 1040.

As shown in FIG. 10, the data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(1)-1016(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1016(1)-1016(N) may correspond to a server having one or more of the above-mentioned computing resources. In addition, in some embodiments, the node C.R.s 1016(1)-10161 (N) may include one or more virtual components, such as vGPUs, vCPUs, and/or the like, and/or one or more of the node C.R.s 1016(1)-1016(N) may correspond to a virtual machine (VM).

In at least one embodiment, grouped computing resources 1014 may include separate groupings of node C.R.s 1016 housed within one or more racks (not shown), or many racks housed in data centers at various geographical locations (also not shown). Separate groupings of node C.R.s 1016 within grouped computing resources 1014 may include grouped compute, network, memory, or storage resources that may be configured or allocated to support one or more workloads. In at least one embodiment, several node C.R.s 1016 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1012 may configure or otherwise control one or more node C.R.s 1016(1)-1016(N) and/or grouped computing resources 1014. In at least one embodiment, resource orchestrator 1012 may include a software design infrastructure (SDI) management entity for the data center 1000. The resource orchestrator 1012 may include hardware, software, or some combination thereof.

In at least one embodiment, as shown in FIG. 10, framework layer 1020 may include a job scheduler 1028, a configuration manager 1034, a resource manager 1036, and/or a distributed file system 1038. The framework layer 1020 may include a framework to support software 1032 of software layer 1030 and/or one or more application(s) 1042 of application layer 1040. The software 1032 or application(s) 1042 may respectively include web-based service software or applications, such as those provided by Amazon Web Services, Google Cloud and Microsoft Azure. The framework layer 1020 may be, but is not limited to, a type of free and open-source software web application framework such as Apache Spark™ (hereinafter "Spark") that may utilize distributed file system 1038 for large-scale data processing (e.g., "big data"). In at least one embodiment, job scheduler 1028 may include a Spark driver to facilitate scheduling of workloads supported by various layers of data center 1000. The configuration manager 1034 may be capable of configuring different layers such as software layer 1030 and framework layer 1020 including Spark and distributed file system 1038 for supporting large-scale data processing. The resource manager 1036 may be capable of managing clustered or grouped computing resources mapped to or allocated for support of distributed file system 1038 and job scheduler 1028. In at least one embodiment, clustered or grouped computing resources may include grouped computing resource 1014 at data center infrastructure layer 1010. The resource manager 1036 may coordinate with resource orchestrator 1012 to manage these mapped or allocated computing resources.

In at least one embodiment, software 1032 included in software layer 1030 may include software used by at least portions of node C.R.s 1016(1)-1016(N), grouped computing resources 1014, and/or distributed file system 1038 of framework layer 1020. One or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016 (1)-1016(N), grouped computing resources 1014, and/or distributed file system 1038 of framework layer 1020. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1034, resource manager 1036, and resource orchestrator 1012 may implement any number and type of self-modifying actions based on any amount and type of data acquired in any technically feasible fashion. Self-modifying actions may relieve a data center operator of data center 1000 from making possibly bad configuration decisions and possibly avoiding underutilized and/or poor performing portions of a data center.

The data center 1000 may include tools, services, software, or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1000. In at least one embodiment, trained or deployed machine learning models corresponding to one or more neural networks may be used to infer or predict information using resources described above with respect to the data center 1000 by using weight parameters calculated through one or more training techniques, such as but not limited to those described herein.

In at least one embodiment, the data center 1000 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 900 of FIG. 9—e.g., each device may include similar components, features, and/or functionality of the computing device(s) 900. In addition, where backend devices (e.g., servers, NAS, etc.) are implemented, the backend devices may be included as part of a data center 1000, an example of which is described in more detail herein with respect to FIG. 10.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 900 described herein with respect to FIG. 9. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A processor comprising:
   one or more circuits to perform automatic speech recognition (ASR) using one or more ASR machine learning models (MLMs), the one or more ASR MLMs trained, at least, by:
   generating, using one or more ASR MLMs and first textual data, one or more spectrograms;
   generating, using the one or more ASR MLMs and the one or more spectrograms, output data indicating second textual data; and
   updating one or more parameters of the one or more ASR MLMs based at least on the output data and ground truth data associated with the first textual data.

2. The processor of claim 1, wherein the one or more ASR MLMs are initially trained using first training sets of audio data inputs and textual data ground truth, and the updating the one or more parameters is performed as part of adapting the one or more ASR MLMs to a target domain using second training sets of textual data inputs and textual data ground truth.

3. The processor of claim 1, wherein the one or more ASR MLMs are further trained, at least, by:
generating one or more second spectrograms using audio data;
generating, using the one or more ASR MLMs and the one or more second spectrograms, second output data indicating third textual data; and
updating the one or more parameters of the one or more ASR MLMs based at least on the second output data and ground truth data associated with the audio data.

4. The processor of claim 1, wherein the one or more ASR MLMs are further trained, at least, by:
providing text input to at least one first MLM of the one or more ASR MLMs;
generating, based at least on the text input, one or more initial spectrograms using the at least one first MLM; and
generating, based at least on the one or more initial spectrograms, the one or more spectrograms using one or more generators from one or more generative adversarial networks (GANs).

5. The processor of claim 1, wherein the generating the one or more spectrograms includes applying an initial version of the one or more spectrograms as input to at least two generator blocks of one or more generators of the one or more ASR MLMs.

6. The processor of claim 1, wherein the one or more ASR MLMs are trained as a text-to-speech (TTS) model.

7. The processor of claim 1, wherein the processor is comprised in at least one of:
a control system for an autonomous or semi-autonomous machine;
a perception system for an autonomous or semi-autonomous machine;
a system for performing one or more simulation operations;
a system for performing one or more digital twin operations;
a system for performing light transport simulation;
a system for performing collaborative content creation for 3D assets;
a system for performing one or more deep learning operations;
a system implementing one or more language models;
a system implementing one or more large language models (LLMs);
a system for performing one or more generative AI operations;
a system implemented using an edge device;
a system implemented using a machine;
a system for performing one or more conversational AI operations;
a system for generating synthetic data;
a system incorporating one or more virtual machines (VMs);
a system implemented at least partially in a data center; or
a system implemented at least partially using cloud computing resources.

8. A method comprising:
determining one or more first spectrograms corresponding to at least one of first audio data or first textual data;
generating one or more second spectrograms using the one or more first spectrograms and one or more generators from one or more generative adversarial networks (GANs); and
determining output data indicating at least one of second audio data or second textual data using one or more Machine Learning Models (MLMs) and the one or more second spectrograms.

9. The method of claim 8, further comprising updating, based at least on the output data, one or more parameters of the one or more MLMs using ground truth data associated with the at least one of the first audio data or the first textual data.

10. The method of claim 8, wherein the determining the output data is based at least on applying the one or more second spectrograms to the one or more MLMs.

11. The method of claim 8, wherein the generating the one or more second spectrograms includes applying the one or more first spectrograms as input to at least two generator blocks of the one or more generators.

12. The method of claim 8, wherein the one or more MLMs are initially trained using first training sets of audio data inputs and textual data ground truth, and the output data is used to adapt the one or more MLMs to a target domain.

13. The method of claim 8, further comprising generating the one or more first spectrograms using one or more second MLMs.

14. The method of claim 8, wherein the one or more MLMs are deployed as at least part of a language processing system.

15. A system comprising:
one or more processing units to perform one or more operations using one or more first machine learning models (MLMs), the one or more first MLMs trained, at least, by generating, using the one or more first MLMs and one or more audio representations, output data indicating first textual data, the one or more audio representations generated using second textual data applied to one or more second MLMs.

16. The system of claim 15, wherein the one or more first MLMs are initially trained using first training sets of audio data inputs and textual data ground truth, and the output data is used to adapt the one or more first MLMs to a target domain.

17. The system of claim 15, wherein the one or more audio representations are generated based at least on applying one or more initial audio representations to one or more generators from one or more generative adversarial networks (GANs).

18. The system of claim 15, wherein the one or more audio representations are generated, at least, by applying an initial version of the one or more audio representations as input to at least two generator blocks of one or more generators.

19. The system of claim 15, wherein the one or more second MLMs include one or more TTS models.

20. The system of claim 15, wherein the system is comprised in at least one of:
a control system for an autonomous or semi-autonomous machine;
a perception system for an autonomous or semi-autonomous machine;
a system for performing one or more simulation operations;

a system for performing one or more digital twin operations;
a system for performing light transport simulation;
a system for performing collaborative content creation for 3D assets;
a system for performing one or more deep learning operations;
a system implementing one or more language models;
a system implementing one or more large language models (LLMs);
a system for performing one or more generative AI operations;
a system implemented using an edge device;
a system implemented using a machine;
a system for performing one or more conversational AI operations;
a system for generating synthetic data;
a system incorporating one or more virtual machines (VMs);
a system implemented at least partially in a data center; or
a system implemented at least partially using cloud computing resources.

* * * * *